United States Patent
Johansson

(10) Patent No.: US 7,594,960 B2
(45) Date of Patent: Sep. 29, 2009

(54) METHOD AND APPARATUS FOR MONITORING THE CONDITION OF A FLEXIBLE FILTER

(75) Inventor: Ronald C. Johansson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 356 days.

(21) Appl. No.: 11/420,663

(22) Filed: May 26, 2006

(65) Prior Publication Data

US 2007/0272082 A1  Nov. 29, 2007

(51) Int. Cl.
*B01D 46/46* (2006.01)
(52) U.S. Cl. ............... 96/417; 55/DIG. 34; 96/423; 116/DIG. 25
(58) Field of Classification Search .......... 55/471, 55/DIG. 34; 116/DIG. 25; 96/416, 417, 96/424, 423; 95/19, 23, 1
See application file for complete search history.

(56) References Cited

U.S. PATENT DOCUMENTS

| | | | |
|---|---|---|---|
| 1,863,456 A * | 6/1932 | Smith | ............ 96/417 |
| 3,928,006 A | 12/1975 | Martineau | |
| 4,321,070 A | 3/1982 | Bede | |
| 4,629,479 A * | 12/1986 | Cantoni | ............ 96/55 |
| 5,352,255 A | 10/1994 | Taft | |
| 5,718,822 A * | 2/1998 | Richter | ............ 210/90 |
| 6,168,646 B1 | 1/2001 | Craig et al. | |
| 6,320,513 B1 | 11/2001 | Timmons, Jr. | |
| 6,494,940 B1 * | 12/2002 | Hak | ............ 96/224 |
| 6,508,868 B2 * | 1/2003 | Pillion et al. | ............ 96/416 |
| 6,734,801 B2 | 5/2004 | Scofield | |
| 6,888,466 B2 | 5/2005 | Dermody | |
| 6,979,361 B2 * | 12/2005 | Mihayiov et al. | ............ 96/26 |
| 2002/0029733 A1 | 3/2002 | Timmons, Jr. | |
| 2004/0001003 A1 | 1/2004 | Scofled | |
| 2004/0011147 A1 * | 1/2004 | Saida | ............ 73/865.9 |
| 2004/0112273 A1 | 6/2004 | Thoede et al. | |

FOREIGN PATENT DOCUMENTS

KR  10-2004-0096833  11/2004
KR  10-2005-0098160  10/2005

* cited by examiner

*Primary Examiner*—Duane Smith
*Assistant Examiner*—Minh-Chau T Pham
(74) *Attorney, Agent, or Firm*—David B. Patchett

(57) ABSTRACT

A system for periodically or continuously monitoring the condition of a filter includes a filter having a peripheral frame and a flexible interior filtering region, a fixed support structure for receiving the filter and maintaining the perimeter of the filter frame in a generally fixed position while allowing the interior filtering region to flex in response to flow through the filter, and a force measuring device mounted on the downstream side of the filter adjacent the interior filtering region in a fixed position relative to the supporting structure, whereby as the interior filtering region flexes in response to flow through the filter, the interior filtering region exerts a force on the force measuring device that increases with the degree of clogging of the filter. A method of monitoring the condition of a filter is also disclosed.

16 Claims, 2 Drawing Sheets

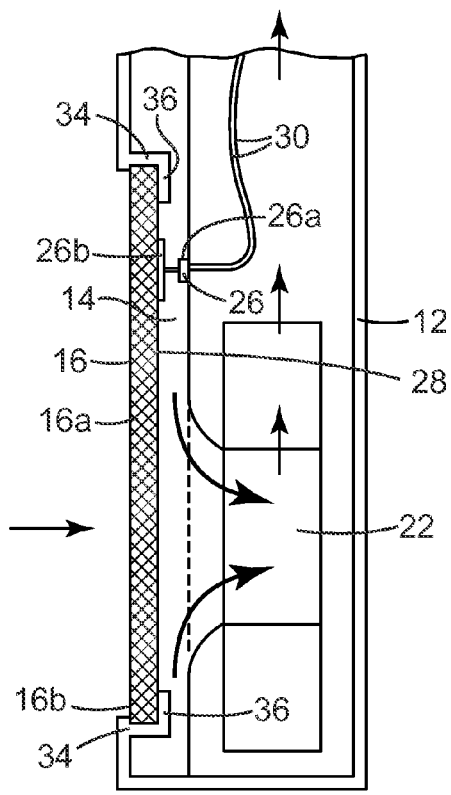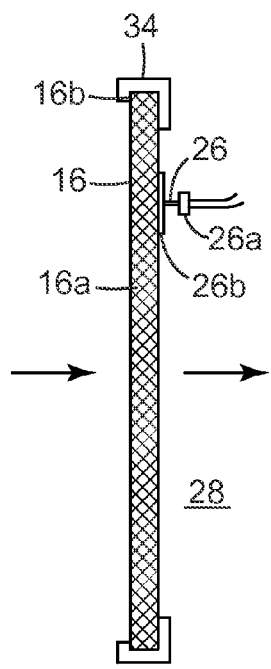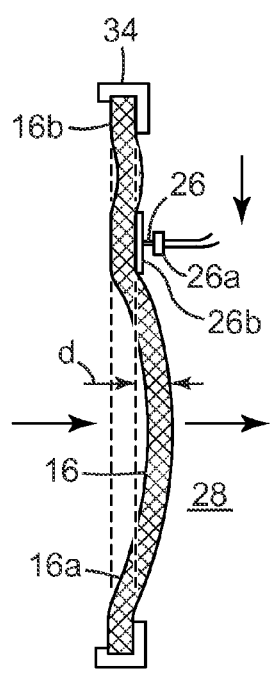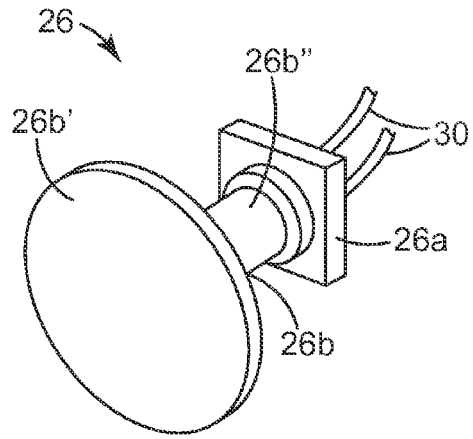

METHOD AND APPARATUS FOR MONITORING THE CONDITION OF A FLEXIBLE FILTER

BACKGROUND

The present invention relates generally to systems including filters and, more particularly, to a method and apparatus for monitoring the condition of a filter in a system including an air filter.

Disposable air filters are commonly used in commercial and residential heating, ventilating and air conditioning (HVAC) systems, and in portable air purification units. Such filters typically include a frame, a fibrous non-woven filter material, and a reinforcing structure that supports the filter material. After a period of use, these filters become dirty or clogged and must be replaced. Proper filter maintenance helps keep the HVAC equipment operating at maximum efficiency and reduces operating costs. Depending on the operating conditions, filter replacement may be required several times a year. Filter replacement is typically done on a regular, fixed-interval basis. That is, the filter is replaced after a certain recommended fixed period of time, such as three months, has passed. This fixed period of time, however, may not be appropriate for a given situation. For example, the fixed time period may be too short, in which case the filter is discarded prematurely, or the fixed time period may be too long, in which case the filter is used beyond the time when it should have been changed. Individuals may also lose track of when the filter was last changed or may forget to change the filter at the appointed time. Changing the filter prematurely is wasteful and results in unnecessary expense, and waiting too long can result in system inefficiency or may negatively impact air quality.

The pressure drop across a typical filter in a residential or commercial HVAC system, or in a portable room air purification unit, is usually quite low. For example, the pressure drop across a new filter may be about 0.2 inches of water (0.008 pounds per square inch—psi), and a filter in need of changing or cleaning may have a pressure drop of about 0.6 inches of water (0.024 psi). Devices used to measure pressures in this range are typically very delicate and expensive, and are generally ill-suited for use in consumer products.

Devices for indicating when to change or clean an air filter are known in the prior art. U.S. Pat. No. 4,321,070 (Bede), for example, discloses a whistle which, when installed in an air filter, emits a shrill tone to signal a predetermined clogged condition of the filter at which time the filter should be cleaned or replaced.

U.S. Pat. No. 3,071,914 (Gesmar) discloses a filter condition indicator for a filter fan using a differential pressure gauge. The differential pressure gauge includes a hollow indicator tube and a float that moves in response to the pressure differential. U.S. Pat. No. 5,668,535 (Hendrix et al) discloses a filter condition sensor and indicator in which a heated thermistor is positioned in a by-pass air flow path.

Residential HVAC systems and portable air purifiers often utilize high performance filters commonly referred to as panel filters or pleated filters. Such filters are available from 3M Company, St. Paul Minn., under the Filtrete™ brand. Such filters have a generally thin flat construction and include a somewhat rigid peripheral frame and an interior filtering region formed from a fibrous non-woven filter media. To improve the performance of such filters, the filter media may be electrostatically charged. Such filters come in a variety of sizes and may include a support structure formed of, for example, wire mesh, paperboard, chipboard or glue to provide additional support for the filter media. Even with such support structures, however, the interior filtering region of such filters tends to exhibit a certain degree of bending, flexing, bowing, or bulging when subjected to the load created by air passing through the filter.

Devices that detect a predetermined extent of filter budge to operate an end-of-life signal are also known in the patented prior art. U.S. Pat. No. 3,928,006 (Martineau) discloses a device for signaling dirty filters including a position sensitive electrical switch positioned to detect a predetermined extent of filter bulge, thereby to operate an end-of-filter-life signal. This device, however, suffers from certain limitations and drawbacks. For example, the operation of this device is highly sensitive to the position of the device relative to the filter, and therefore requires a mounting structure that allows the position of the device to be calibrated depending on the type of filter used and/or the operating conditions. In addition, the device is not capable of providing information about the condition of the filter continuously or periodically throughout the life of the filter.

There is still a need, however, for a system and/or device that can monitor the condition of a filter based on the degree of bowing or flexing of the filter. That is, there is a need for a system and/or device that can provide a person responsible for changing and/or cleaning a filter with information about the condition of the filter throughout the life of the filter including from the time a new clean filter is installed in the system and bows only minimally when subjected to an air stream, during the time when the filter is being used but is not yet in need of replacement and/or cleaning and the filter bows increasingly as the filter becomes more clogged, and up to the time when the filter becomes unacceptably clogged and is in need of replacement or cleaning.

It would be desirable to provide a small, simple, inexpensive system and/or device that can accurately and reliably monitor the condition of a filter, such as an air filter, either continuously or periodically over the entire life of the filter.

SUMMARY

In one aspect, the apparatus of the present invention provides a system which periodically and/or continuously monitors the condition of a flexible air filter over the life of the air filter when air is flowing through the filter. The air filter condition monitoring system comprises an air filter having a peripheral frame and an interior filtering region, a fixed support structure for receiving the air filter and maintaining the perimeter of the filter frame in a generally fixed position while allowing the interior filtering region to flex in response to air flow through the filter, and a force measuring device mounted on the downstream side of the filter adjacent the interior filtering region in a fixed position relative to the supporting structure, wherein as the interior filtering region flexes in response to air flow through the filter, the interior filtering region is urged into contact with, and exerts a force on, the force measuring device that increases with the degree of clogging of the filter.

The system is typically used with a pleated, flat-panel type filter construction that filters air in a stream moving in a direction generally orthogonal to opposed major surfaces of the filter, but the system may be used with other types of filters. The system may be part of a portable self-contained room air purification system or part of a central residential air handling system.

In one embodiment, the system includes a display that indicates the degree of clogging of the filter in terms of the percentage of useful filter life remaining. In another embodiment, the display includes three filter condition indicators: (1) a good condition, (2) an indication that the filter will require maintenance soon, and (3) an indication that the filter is presently in need of maintenance.

The force measuring device typically comprises a force sensor. The force measuring device typically includes a filter engagement member arranged adjacent the flexible interior filtering region of the filter. For a typical residential furnace filter, the filter engagement member would typically have an area of about 2 in$^2$ to about 10 in$^2$. In certain embodiments, the surface area of the filter engagement member that contacts the filter may be between 1% and 50% or more of the surface area of the interior filtering region of the filter. If used with a pleated filter, the filter engagement member will typically have a size and shape that allows the filter engagement member to bridge the gap between adjacent pleat tips of the filter. In a more specific embodiment, the filter engagement member will have at least one dimension that is at least three times (3×) the distance between adjacent pleat tips, thereby allowing the filter engagement member to be positioned to engage multiple pleat tips.

In a specific embodiment, the filter engagement member is a circular disk. In another embodiment, the filter engagement member may include openings that permit air to flow through the filter engagement member, thereby to minimize the impact the disk has on the flow of air through the filter.

In one embodiment, the force measuring device is located somewhat off-center from the interior filtering region of the filter, but the force measuring device may also be located near the center of the interior filtering region of the filter. In another embodiment, the filter condition sensor is spaced a distance between 0 inches and ⅛ of an inch (3 mm) from the surface of the filter media.

In another aspect, the apparatus of the present invention provides an air filter condition monitoring device comprising a force sensor, an extension arm extending perpendicularly outwardly from the force sensor, and a filter engagement element arranged on the terminal end of the extension arm opposite the force sensor, wherein the filter engagement element comprises an engagement surface for contacting the filter, and the engagement surface has a surface area of at least about 2 in$^2$.

The present invention also provides a method of monitoring the condition of an air filter wherein the air filter includes filter media having a peripheral region fixed to a support structure and a flexible interior filtering region that flexes as the result of air flow therethrough, the method comprising the step of arranging a force measuring device adjacent the downstream side of the filter at a predetermined location wherein when the filter is clean, the interior filtering region flexes and contacts the force measuring device when air is passing through the filter, and further wherein as the filter becomes loaded with filtered particulates, the interior filtering region will exert an increasing force against the force measuring device when air is passing through the filter.

In a specific embodiment, the present invention provides a portable room air purifying device including a housing including an air filtering chamber having an air inlet opening and an air discharge opening, a pleated flat-panel filter mounted in the filtering chamber between the inlet and the discharge openings. The filter includes a peripheral frame mounted in a fixed position relative to the housing and includes a flexible interior filtering region comprising fibrous filter media that bows outwardly with respect to the frame when air flows through the filter. A force sensor is arranged at a predetermined stationary location relative to the housing, and a filter engagement member is connected with the force sensor and is arranged to actuate the force sensor as the filter applies force against the filter engagement member.

In this application, "filtered particulate material", "filtered particulates", "particulate material" and "particulate debris" refer to dirt, dust, pollen, mold, smoke, pet dander, micro-organisms or any other airborne particles filtered from the air stream as air passes through the filter media.

Advantages of certain embodiments of the invention include providing a small, reliable, inexpensive system and/or device that is easy to install and easy to use, and is able to accurately and reliably monitor the condition of a filter, such as an air filter. The invention provides a device that can be incorporated into new systems or can be easily retrofit into existing systems. In addition, the present invention measures the force produced by the bowing of a filter (or measures the force produced by the filter as the filter attempts to bow in the region where the filter contacts the force measuring device) as the filter becomes increasingly loaded with filtered particulates. Based on the measured force, the present invention can provide information to a user about the condition of the filter either periodically or continuously over the entire life of the filter.

BRIEF DESCRIPTION OF THE DRAWINGS

The present invention will be further described with reference to the accompanying drawings, in which:

FIG. 2 is a diagrammatic side view showing the primary internal components of an air handling system including a filter and a filter condition sensor;

FIG. 3a is a side view showing the position of the filter and the filter condition sensor for a new or relatively clean filter;

FIG. 3b is a side view showing the filter of FIG. 3a in a displaced position after it has been used for a period of time and become loaded with particulate debris and the filter condition indicator is in its force measuring condition; and FIG. 4 is an enlarged perspective view of a filter condition sensor according to the invention.

DETAILED DESCRIPTION

Figure 1:
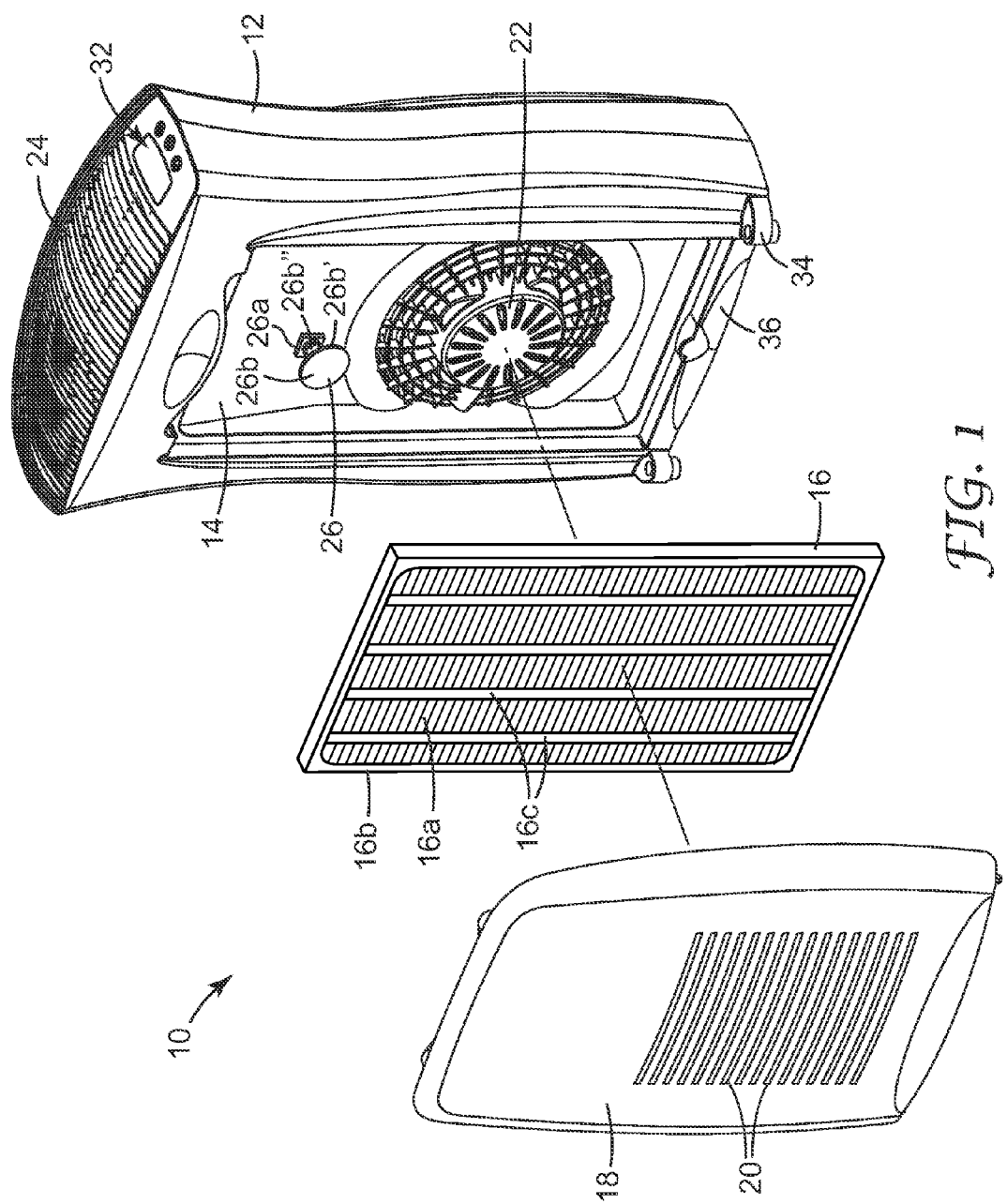
FIG. 1 is an exploded view of a portable air purifying unit including a filter condition sensor according to the invention.

Referring now to the drawings, wherein like reference numerals refer to like or corresponding parts throughout the several views, FIG. 1 shows a portable air purification unit 10 generally including a housing 12 containing an interior air handling chamber 14, a filter 16 removably arranged in the chamber 14, and a cover 18 removably arranged over the filter 16. Although the invention is shown and described below in reference to a portable air purification unit, the invention may also be incorporated into, for example, a central residential, industrial, or commercial HVAC system.

The cover 18 includes a grill with air intake openings 20 that allow unfiltered air to enter the air handling chamber 14 and pass through the filter 16, whereby entrained contaminants such as dirt, dust, pollen, mold, smoke, pet dander, micro-organisms or any other airborne particles that can be captured by the particular filter used are removed from the air stream.

The present invention is not limited for use with any particular type of filter media or filter construction, and may be used with any conventional filter construction, so long as the filter media exhibits some degree of flexibility and tends to bow outwardly a certain minimal distance in response to an air stream passing through the filter. Such filters include, for example, conventional pleated, flat-panel type filters formed of fibrous non-woven materials, which may or may not include a secondary reinforcing structure to provide additional support for the filter media, and filters that include somewhat stiff filter media. A filter without a secondary reinforcing structure may be constructed using, for example, BBA Melfab 80 media, a fibrous polypropylene nonwoven media available from BBA Fiberweb Terram Limited, Gwent, United Kingdom. The filter may be produced by pleating the Melfab 80 media and then heat setting the pleats.

In the illustrated embodiment, the filter 16 is a pleated, flat-panel type of filter including pleated filter media defining an interior filtering region 16a of the filter. The interior filtering region 16a is typically a fibrous non-woven material which may be electrostatically charged to enhance its particle capturing ability. The interior filtering region 16a is surrounded by an optional peripheral frame 16b. The frame 16b is constructed to provide a somewhat stiff support structure that allows the filter 16 to be mounted in the air purification unit 10. By stiff, it is generally meant that the frame 16b is able to withstand forces typically encountered by a filter in a given installation. That is, the frame 16b may deform somewhat during the operation of the system, but will generally retain its overall shape and will not buckle or otherwise be permanently deformed when used as intended. The frame 16b may be formed of, for example, paperboard, chipboard or a synthetic plastic material. It will be recognized that the frame 16b may be omitted so long as the periphery of the filter media can be secured in a manner that allows it to remain in a fixed position relative to the housing 12 when air is forced through the filter, and so long as the interior filtering region 16a would tend to flex to a measurable degree in response to the air stream.

In the illustrated embodiment, the filter 16 includes an optional secondary reinforcing structure 16c arranged across the face of the interior filtering region 16a to provide the interior filtering region 16a with added support and/or to provide pleat spacing. The reinforcing structure 16c may comprise, for example, wire mesh, paperboard, chipboard or strands of glue applied across the pleated filter media. In the illustrated embodiment, the secondary reinforcing structure 16c is formed of strands of glue applied across the pleated filter media. A suitable filter having a secondary reinforcing structure formed from strands of glue is disclosed in U.S. Patent Publication No. 2006/0005517 (Duffy et al.), the entire contents of which are hereby incorporated by reference. Even with the secondary reinforcing structure 16c, the interior filtering region 16a will tend to bow outwardly in the downstream direction as air passes through the filter 16.

Alternatively, the filter media itself may be sufficiently strong so that no secondary reinforcing structure is needed. That is, the present invention may be used with somewhat stiff filter media. Filters formed of such stiff filter media, however, typically exhibit a certain degree of bowing when subjected to an air stream and will experience increased bowing as the filter becomes increasingly loaded with filtered particulate material, which makes filters formed of such filter media suitable for use in the present invention.

A centrifugal fan 22 is arranged in the housing 12 to draw unfiltered air through the air intake openings 20 of the cover 18, through the filter 16, and into the air handling chamber 14. After the air passes through the filter 16, the filtered air exits the housing 12 through the exit grill 24.

In accordance with a characterizing aspect of the air purification unit 10, a filter condition sensor 26 is mounted in the air handling chamber 14 adjacent the downstream side 28 of the filter 16. FIGS. 2 and 3a show the filter 16 in its initial undisplaced position, and FIG. 3b shows the filter 16 in its displaced position (displaced a distance "d"). The initial position generally corresponds to either the location of the filter 16 when the unit 10 is off and no air is being forced through the filter 16, or to the location of the filter 16 when the unit 10 is on and air is being forced through the filter 16 but the filter is new, or relatively new, and has not yet experienced a significant degree of loading, such that air can readily pass through the filter without significantly flexing or deforming the filter. The displaced position generally corresponds to the location of the filter after the filter has experienced some degree of loading and the filter flexes or bows outwardly in the downstream direction when air is forced through the filter.

Referring to FIG. 4, the filter condition sensor 26 includes a force sensor 26a, which measures the force applied by the bowed filter 16, and a filter engagement member 26b, which is connected with the force sensor 26a and comes into contact with the bowed filter when a force is being measured. A force sensor 26a suitable for use in the filter condition sensor 26 is available from HVW Technologies Inc. Calgary, Alberta, Canada under the product designation IESP-12 force sensor. Other electronic force transducers, and other conventional force sensors, such as spring loaded force sensors or hydraulic force sensors, may also be used.

In the illustrated embodiment, the filter condition sensor 26 is mounted on the inner surface of the air handling chamber 14 at a location offset from the center of the filter 16. That is, the filter condition sensor 26 is mounted at a location beyond the outer perimeter of the fan impeller when viewing the unit 10 straight on from the front. Surprisingly, it has been found that when the filter condition sensor 26 is mounted off center, the sensor 26 still yields acceptable output. The sensor 26, however, may also be mounted at or near the center of the interior filtering region 16a of the filter 16.

The filter engagement member 26b may be mounted in contact with the interior filtering region 16a, flush with (i.e. immediately adjacent) the interior filtering region 16a, or the filter engagement member 26b may be spaced from the filter media a predetermined distance. The amount of spacing will depend, for example, on the type of filter being used and the air flow rate. In the case of a typical furnace filter construction, it was found that acceptable results could be obtained by spacing the filter engagement member 26b up to about one eighth (⅛) of an inch (3 mm) from the surface of the interior filtering region 16a of the filter. The maximum spacing selected, however, will depend on a number of factors including, for example, the size of the filter, the flexibility of the filter media, and the air flow rate through the filter. In many cases, it may be desirable to have the filter engagement member 26b positioned so that it always contacts the interior filtering region 16a of the filter 16, even when the unit is turned off.

Filters constructed from stiff filter media, or filters which include a secondary structure that provides additional support for the media, generally do not deform as readily as those constructed from flexible media that do not have a secondary support structure and, as a result, will tend to produce less force. However, because the filter condition sensor 26 is mounted in a fixed position and, therefore, remains essentially stationary during the operation of the filtration system, filters that flex even a small amount under a given load will generate a force on the filter condition sensor 26. When properly positioned, even such relatively small forces can be measured using the filter condition sensor 26 of the present invention, and may be correlated to provide information continuously or periodically about the condition of the filter. With such stiff filters, however, proper placement of the filter condition sensor 26 adjacent the filter becomes more important. That is, because the degree of flexing of such stiff filters is generally small, the filter condition sensor 26 must be positioned more precisely so it can measure the force generated by the tendency of the filter to bow.

A pair of wires 30 connect the filter condition sensor 26 to a display 32 located on the top of the housing 12. The display 32 may include audio or visual output to inform a user about the condition of the filter 16. For example, the output may include an indication that the filter 12 is in need of maintenance. The maintenance to be provided may be in the form of either cleaning the filter or replacing the filter. The display 32 may also provide information about the condition of the filter 16 in terms of the percentage of useful life remaining for the filter. Alternatively, the display 32 may provide more discrete information about the filter 16 such as an indication that: (1) the filter is in good condition, (2) an indication that the filter will require maintenance (i.e. either cleaning or replacement) soon and that the user should therefore procure a replacement filter, if necessary, and (3) an indication that the filter is presently in need of maintenance and should therefore be cleaned or changed immediately. Information about the condition of the filter 16 may be provided either periodically or continuously over the life of the filter. In the case where the filter condition sensor is used in conjunction with a central residential HVAC system including a remotely located thermostat unit, the display may be provided near, with, or be incorporated into, the remotely located thermostat unit.

As shown most clearly in FIGS. 2 and 3a, the filter 16 is mounted in the air handling chamber 14 via a support structure 34. In the illustrated embodiment, the support structure 34 comprises tabs 36 that form slots for receiving the peripheral frame portion 16b of the filter 16, and thereby serve to maintain the perimeter of the filter in a generally fixed position while allowing the interior filtering region 16a to flex in response to air flow through the filter 16.

It will be understood that as air passes through the filter 16, the interior filtering region 16a will have a tendency to bow outwardly in the downstream direction. Once the filter 16 contacts the filter engagement member 26b, however, additional bowing or flexing of the interior filtering region 16a in the area in contact with the filter engagement member 26b is essentially prevented because the position of the filter engagement member 26 is essentially fixed. That is, the force measured by the force sensor 26a is produced by the interior filtering region 16a pushing against the filter engagement member 26b. When the interior filtering region 16a of the filter is in contact with the filter engagement member 26 and the force sensor 26a is measuring a force, the area of the interior filtering region 16a not in contact with the filter engagement member 26b will continue to bow or flex, but the area in contact with the filter engagement member 26b will not. Thus, the force measured by the force sensor 26a is actually generated by the interior filtering region's 16a desire to continue bowing or flexing in the area in contact with the filter engagement member 26b.

The force sensor 26a is mounted at a fixed position relative to the support structure 34, and the filter engagement member 26b extends outwardly from the force sensor to a position adjacent the downstream side 28 of the interior filtering region 16a of the filter 16. As shown in FIGS. 3a and 3b, when mounted in this manner, as the filtering region 16a begins to flex in response to air flow through the filter 16, the interior filtering region 16a bows outwardly in the downstream direction from an initial position (FIG. 3a) to a displaced position (FIG. 3b), and exerts a force against the filter engagement member 26b, which in turn actuates the force sensor 26a.

The force exerted on the force sensor 26a increases as the filter becomes increasingly clogged with filtered particulate material. It will be recognized that the position of the force sensor 26a must be fixed relative to the support structure 34 so the force sensor 26a can measure the force produced by the interior filtering region 16a as it bows in response to the air stream. That is, the force sensor 26a remains stationary relative to the housing 12 when acted upon by the force of the bowing filter. The filter condition sensor 26, however, may be located at different fixed positions depending on, for example, the type of filter used and the air flow rate. The appropriate fixed position of the filter condition sensor 26 can be calibrated for a particular filter and a particular set of operating conditions depending on, for example, the at rest position of the interior filtering region 16a (i.e. the position of the filter media when no air is passing through the filter), the initial displaced position of the interior filtering region 16a (i.e. the position of the filter media when air is passing through the filter and the filter is new), and the final displaced position of the interior filtering region 16a (i.e. the position of the filter media when air is passing through the filter and the filter is fully loaded with filtered particulates and is in need of cleaning or replacement).

As noted above, the filter condition sensor 26 includes a filter engagement member 26b extending outwardly from the force sensor 26a. The filter engagement member 26b is arranged adjacent the interior filtering region 16a of the filter 16 to measure the force generated by the filter 16 as the filter bows outwardly in the downstream direction. The term "adjacent" refers to the filter engagement member 26b being in close proximity to the filter media when the system is inoperative and, thus, no air is passing through the filter 16. Adjacent includes the case where the filter engagement member 26b contacts the interior filtering region 16a of the filter, the case where the filter engagement member 26b is arranged immediately adjacent the interior filtering region 16a of the filter, and the case where the filter engagement member 26b is spaced a nominal distance from the interior filtering region 16a of the filter, wherein the nominal distance generally corresponds to the distance between the at rest position of the interior filtering region 16a and the initial displaced position of the interior filtering region 16a.

Thus, in one embodiment, the filter engagement member 26b may be positioned to contact the filtering region 16a of the filter 16 when the system is off and no air is passing through the filter. Alternatively, the filter engagement member 26b may be spaced a small distance from the filtering region 16a of the filter such that, when the filter is clean and new, and air is passing through the filter, the filtering region 16a will bow outwardly and will be displaced to the location of, and into contact with, the filter engagement member 26b. In one aspect of the invention, the particular location of the filter engagement member 26b is selected so that the condition of the filter can be monitored throughout the life of the filter. It is desirable to locate the filter engagement member 26b so it is in contact with the filtering region 16a throughout the entire life of the filter, or at least throughout the majority of the life of the filter. In this regard, the position of the filter engagement member 26b may correspond to, or be in the same plane as, the initial bowed-out position of the filtering region 16a—at the location of the filter engagement member 26b—when the filter is new and clean, and air is passing through the filter media at the desired operating flow rate. In addition, the filter engagement member 26b may be initially positioned or forced "into" the filtering region 16a of the filter. That is, the filter engagement member 26b may be urged in the upstream direction into the filter such that the filter engagement member 26b presses against the filtering region 16a of the filter when the unit is not operating.

In the illustrated embodiment, the filter engagement member 26b includes a disk 26b' arranged on the terminal end of an optional extension arm 26b'' that is attached to the force sensor 26a. The extension arm 26b'' is provided to position the disk 26b' adjacent the surface of the filter 16. Although a thin circular disk 26b' is shown, other shapes and thicknesses may be used.

As explained above, filters tend to bow or bend outwardly in the downstream direction in relation to the pressure drop across the filter. The degree of bending, however, is dependent on a number of factors and, in the past, it has not always easy to obtain a reliable and repeatable measure of the filter condition based on the degree of bowing. It has been found, however, that when the filter engagement member 26b is provided with a disk 26b' having a certain surface area and is placed at a specific location adjacent the downstream side of the filter, the force measured by the force sensor 26a can be accurately correlated to the pressure drop across the filter 16.

In particular, a disk 26b' having an area of at least about 2 square inches—$in^2$ (13 square centimeters—$cm^2$) and more typically, at least about 3 $in^2$ (20 $cm^2$) has been found to produce reliable repeatable results for conventional pleated residential furnace air filters. If the area of the disk 26b' is too large, it may unduly impede the air flow through the filter and adversely effect the performance of the filter. It has also been found that when used with most standard sized residential air filters, it is desirable that the disk 26b' have an area of no greater than about 10 $in^2$ (65 $cm^2$). Disks having larger areas, however, may be used depending on the type of filter and the operating conditions. To minimize any adverse impact the disk 26b' may have on the air flow through the filter, the disk may optionally contain holes or openings (not shown) that allow air to pass through the disk 26b'.

The disk 26b' generally prevents at least the portion of the interior filtering region 16a in direct contact with the disk 26b' from bowing outwardly in the downstream direction (due to the flow of air through the filter) once that portion of the filter media has contacted the disk 26b'. That is, because the location of the disk 26b' is essentially fixed, once the interior filtering region 16a contacts the disk 26b', additional bowing or flexing of the filter media in direct contact with the disk 26b' is prevented.

The disk 26b' and extension arm 26b'' may be formed from a variety of materials including, for example, metal or a synthetic plastic materials.

According to one aspect of the method of the present invention, the filter condition sensor 26 is used to monitor the condition of an air filter 16 having a frame 16b fixed in a support structure 34 and an interior filtering region 16a that flexes as a result of air flow through the filter 16. The method includes arranging the filter condition sensor 26 adjacent the downstream side of the filter 16 at a predetermined location. When the filter 16 is new and clean, or relatively new and clean, the interior filtering region 16a of the filter 16 will be urged against the filter engagement member 26b' when air passes through the filter 16. As the filter 16 becomes increasingly loaded with filtered particulates, the interior filtering region 16a will exert an additional or increasing force against the filter condition sensor 26 when air passes through the filter 16. The force measured by the filter condition sensor 26 is generally proportional to the degree of loading on the filter and/or to the pressure drop across the filter. The filter condition sensor 26 then produces a signal corresponding to the measured force, and transmits the signal via the wires 30 to the display 32 which provides information about the condition of the filter 16 to the individual or individuals responsible for maintaining the filter 16.

Because some filters may lose efficiency over time without exhibiting significant pressure drop or loading, in some end-use applications, it may be desirable to use the filter condition sensor 26 in combination with a conventional timer (not shown) that informs a user to replace the filter after a period of time regardless of whether the filter condition sensor 26 has signaled the need to clean or replace the filter.

Persons of ordinary skill in the art may appreciate that various changes and modifications may be made to the invention described above without deviating from the inventive concept. For example, although the present invention is shown and described in connection with a portable air purification unit, it will be recognized that it may also be incorporated into a permanent central residential or commercial HVAC system. In addition, the monitoring system may be designed into new systems or may be retrofit into existing systems. The present invention may also be used with disposable filters that are replaced when a certain predetermined level of loading is reached, or the present invention may be used with reusable filters that may be cleaned and subsequently reused when a certain predetermined level of loading is reached. The present invention is also not limited for use with air filters but may be used in conjunction with any variety of fluid filters including other filters for gases as well as liquids filters. Thus, the scope of the present invention should not be limited to the structures described in this application, but only by the structures described by the language of the claims and the equivalents of those structures.

What is claimed is:

1. An air filter condition monitoring system for periodically or continuously monitoring the condition of a flexible air filter over the life of the air filter when air is flowing through the filter, the air filter condition monitoring system comprising:
    (a) an air filter having a peripheral frame and an interior filtering region;
    (b) a fixed support structure for receiving the air filter and maintaining the perimeter of the filter frame in a generally fixed position while allowing the interior filtering region to flex in response to air flow through the filter; and
    (c) a force measuring device mounted on the downstream side of the filter adjacent the interior filtering region in a fixed position relative to the supporting structure, wherein as the interior filtering region flexes in response to air flow through the filter, the interior filtering region exerts a force on the force measuring device that increases with the degree of clogging of the filter.

2. An air filter monitoring system as defined in claim 1, wherein the filter has a pleated flat-panel construction that filters air in a stream moving in a direction generally orthogonal to opposed major surfaces of the filter.

3. An air filter monitoring system as defined in claim 1, wherein the support structure is provided as part of a portable self-contained room air purification system.

4. An air filter monitoring system as defined in claim 1, wherein the support structure is provided as part of a central residential air handling system.

5. An air filter monitoring system as defined in claim 1, further comprising a display indicating the degree of clogging of the filter in terms of the percentage of useful filter life remaining.

6. An air filter monitoring system as defined in claim 1, further comprising a display including three filter condition indicators: (1) a good condition, (2) an indication that the filter will require maintenance soon, and (3) an indication that the filter is presently in need of maintenance.

7. An air filter monitoring system as defined in claim 1, wherein the force measuring device comprises an electronic force sensor.

8. An air filter monitoring system as defined in claim 7, wherein the force measuring device includes a filter engagement member arranged adjacent the flexible interior filtering region of the filter.

9. An air filter monitoring system as defined in claim 8, wherein the disk includes openings to minimize the impact the disk has on the flow of air through the filter.

10. An air filter monitoring system as defined in claim 1, wherein the force measuring device is located generally at the center of the interior filtering region of the air filter.

11. An air filter monitoring system as defined in claim 1, wherein the force measuring device is located off-center from the interior filtering region of the air filter.

12. An air filter monitoring system as defined in claim 1, wherein the filter condition sensor is located between 0 inches and ⅛ of an inch (3 mm) from the surface of the filter media.

13. An air filter monitoring system as defined in claim 1, further comprising a timer that notifies a user to replace the filter after a period of time regardless of whether the filter condition sensor has signaled the need to clean or replace the filter.

14. A method of monitoring the condition of an air filter, the air filter including filter media having a peripheral region fixed to a support structure and a flexible interior filtering region that flexes as the result of air flow therethrough, the method comprising the step of arranging a force measuring device adjacent the downstream side of the filter at a predetermined location wherein when the filter is clean, the interior filtering region flexes when air is passing through the filter, and further wherein as the filter becomes loaded with filtered particulates, the interior filtering region will exert an increasing force against the force measuring device when air is passing through the filter.

15. A portable room air purifying device, comprising:
(a) a housing including an air filtering chamber having an air inlet opening and an air discharge opening;
(b) a pleated flat-panel filter mounted in the filtering chamber between the inlet and the discharge openings, the filter including a peripheral frame mounted in a fixed position relative to the housing and including a flexible interior filtering region comprising fibrous filter media that bows outwardly with respect to the frame when air flows through the filter;
(c) a force sensor arranged at a predetermined stationary location relative to the housing; and
(d) a filter engagement member connected with the force sensor and arranged to actuate the force sensor in response to the bowing of the filter.

16. An air filter condition monitoring device, comprising:
(a) a force sensor; and
(b) a filter engagement element arranged to transmit a force to the force sensor, wherein the filter engagement element comprises an engagement surface for contacting the filter, the engagement surface having a surface area of at least about 2 in$^2$.

* * * * *